(12) United States Patent
Charles et al.

(10) Patent No.: US 7,925,598 B2
(45) Date of Patent: Apr. 12, 2011

(54) EFFICIENT WEIGHTED CONSISTENT SAMPLING

(75) Inventors: Denis Xavier Charles, Bellevue, WA (US); Kumar Hemachandra Chellapilla, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 617 days.

(21) Appl. No.: 12/019,621

(22) Filed: Jan. 24, 2008

(65) Prior Publication Data

US 2009/0192960 A1 Jul. 30, 2009

(51) Int. Cl.
*G06F 17/00* (2006.01)
*G06F 17/20* (2006.01)

(52) U.S. Cl. .............. 706/11; 708/270; 702/28
(58) Field of Classification Search ......... 708/270; 702/28

See application file for complete search history.

(56) References Cited

U.S. PATENT DOCUMENTS

| | | | |
|---|---|---|---|
| 6,697,800 | B1 | 2/2004 | Jannink et al. |
| 2005/0060643 | A1 | 3/2005 | Glass et al. |
| 2006/0242217 | A1* | 10/2006 | Bartels ............... 708/270 |
| 2007/0005556 | A1 | 1/2007 | Ganti et al. |
| 2007/0027672 | A1 | 2/2007 | Decary et al. |
| 2007/0038659 | A1 | 2/2007 | Datar et al. |
| 2007/0118498 | A1 | 5/2007 | Song et al. |
| 2007/0124698 | A1 | 5/2007 | Majumder |
| 2007/0226188 | A1 | 9/2007 | Johnson et al. |

OTHER PUBLICATIONS

Broder, et al., "Syntactic Clustering of the Web", Jul. 25, 1997, Digital Equipment Corporation, pp. 1-13.
Weis, et al., "Space and Time Scalability of Duplicate Detection in Graph Data", Jun. 2007, pp. 1-28.
Henzinger, "Tutorial: Web Information Retrieval",2007, IEEE, pp. 1-154.
Manasse, et al., "Consistent Weighted Sampling", 2007, pp. 7.
Yang, et al., "Near-Duplicate Detection for eRulemaking", vol. 89, May 2005, p. 9.
Broder, et al., "Min-Wise Independent Permutations", 1998, pp. 1-36.
Gollapudi, et al., "Exploiting Asymmetry in Hierarchical Topic Extraction", 2006, pp. 8.

* cited by examiner

*Primary Examiner* — Donald Sparks
*Assistant Examiner* — Kalpana Bharadwaj
(74) *Attorney, Agent, or Firm* — Capitol City TechLaw; Richard C. Irving (57) ABSTRACT

A method and a processing device may be provided for performing efficient weighted consistent sampling. A group of sets having multiple elements with associated weights may be provided. A single hash function may be applied to each of the elements of the group of sets to produce consistent uniformly distributed non-negative random numbers. Transformed values corresponding to each of the elements may be produced by determining a $w^{th}$ root of a value based on applying the hash function to a respective element, where w may be based on a weight associated with the respective element. A minimum transformed value or a maximum transformed value may be determined for each of the sets. Sets having matching ones of the minimum transformed value or the maximum transformed value may be determined. The determined sets may be considered to be similar.

19 Claims, 7 Drawing Sheets

EFFICIENT WEIGHTED CONSISTENT SAMPLING

BACKGROUND

A search engine may periodically update itself by using a tool called a web crawler. The web crawler may continuously crawl a network to examine network documents, such as, for example, web pages, to determine which of the network documents are linked to others of the network documents and to determine changes in the network documents since the web crawler previously crawled through the network documents. Typically, web crawlers store content of network documents, as well as information concerning links, within the network documents. Usually, network documents do not change very often. When a network document does change, much of the network document remains unchanged.

One technique that was developed to determine whether changes occurred in documents is MinHashing. MinHashing picks a consistent sample from a set. Using the MinHashing technique to determine whether documents are similar, each document may be viewed as a set of elements. The elements may be, for example, words, numbers, links, and/or other items, included in the documents. Each of the elements of each of the sets may be hashed multiple times, using different hashes, to produce multiple groups of hash values, which are consistent uniformly distributed non-negative random numbers for each of the sets. One may then compute a minimum among the hash values in the multiple groups. When a predetermined number of the computed minima of a first set match the predetermined computed minima of a second set, the documents corresponding to the sets may be considered to be duplicates or near-duplicates. The MinHashing technique determines duplicate, or near-duplicate documents in O(N) time for N documents.

A disadvantage of the MinHashing technique is that the MinHashing technique treats all portions of documents equally. Because there may be overlap in unimportant portions of documents, differences in more important portions of the documents may be difficult, if not impossible, to detect. As a result, a weighted consistent sampling technique was developed.

Using the weighted consistent sampling technique, each of the elements has an associated weight, which is a positive integer value. Additional elements may be injected into a set based on weights associated with the elements of the set. For example, if a set includes elements {"the", "of", "conflagration"} having respective weights of {1, 1, 1000}, then additional elements are inserted into the set, such that the number of elements representing the element, "conflagration", is equal to the associated weight. Thus, for example, "conflagration 1", "conflagration 2", ... "conflagration 999" may be inserted as elements into the set. A single hash may then be applied to each of the elements of each of the sets to produce multiple groups of hash values, which are consistent uniformly distributed random numbers for each of the sets. One may then compute a minimum among the hash values in the multiple groups. When a predetermined number of the computed minima of a first set match the predetermined computed minima of a second set, the documents corresponding to the sets may be considered to be duplicates or near-duplicates. The weighted consistent sampling technique described above determines duplicate, or near-duplicate documents in a time period that is exponential with respect to a number of inputs (a number of elements of the sets, including injected elements). That is, a time to process elements, x, of a set S, in which each of the elements has an associated weight, w(x), is $\Sigma_{x \in S} w(x)$.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In embodiments consistent with the subject matter of this disclosure, a method and a processing device may be provided for performing efficient weighted consistent sampling. Given a group of sets, such that each of the sets has a group of elements, a single hash function h(x) (where x represents an element) may be applied to each of the elements to produce consistent uniformly distributed non-negative random numbers. Each of the elements, x, may have an associated weight, which may be a non-negative real number. Transformed values corresponding to each of the elements may be produced by finding a $w^{th}$ root of a value based on h(x), where w may be based on the associated weight.

For each of the sets, either a predetermined number of minimum transformed values, or a predetermined number of maximum transformed values may be determined. Sets having matching ones of the predetermined number of minimum transformed values or matching ones of the predetermined number of maximum transformed values may be determined. The determined sets may be considered to be duplicates or near-duplicates.

Various embodiments consistent with the subject matter of this disclosure, may be used to determine which documents of a group of documents are similar, may be used to perform collaborative filtering, may be used to perform graph clustering, may be used to perform a graph compression, or may be used perform other useful functions.

DRAWINGS

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Embodiments are discussed in detail below. While specific implementations are discussed, it is to be understood that this is done for illustration purposes only. A person skilled in the relevant art will recognize that other components and configurations may be used without parting from the spirit and scope of the subject matter of this disclosure.

Overview

Embodiments consistent with the subject matter of this disclosure may provide a method and a processing device for performing weighted consistent sampling in a more efficient manner than prior art techniques.

A single hash function may be applied to each original element of each of the sets of elements to produce consistent uniformly distributed non-negative random numbers. Each of the elements, x, may have an associated corresponding weight, w(x), which may be a non-negative real number. In one embodiment, transformed values corresponding to an element, x, included in a set S, may be calculated according to:

$$h_x \leftarrow \frac{a - (1 - h(x))^{\frac{1}{w(x)}}}{b} \quad \text{(Equation 1)}$$

where $h_x$ is a transformed value with respect to an element x of a set S, h(x) is a hash function for producing a consistent uniformly distributed random non-negative real number, representing the element x such that $0 \leq h(x) \leq 1$, a and b are constants, and w(x) is based on a weight associated with the element x. In some embodiments, h(x) may not be in a range from 0 to 1. However, in such embodiments, h(x) may be normalized to produce a real number value in the range from 0 to 1. Further, in some embodiments, w(x) may be the weight associated with the element x. In embodiments consistent with the subject matter of this disclosure, transformed values may be produced in only a single pass through the original elements of each of the sets.

For each of a number of sets, either a predetermined number of minimum transformed values, or a predetermined number of maximum transformed values may be determined. Ones of the sets having matching ones of the predetermined number of minimum transformed values or matching ones of the predetermined number of maximum transformed values may be determined. When each of the sets correspond to a respective document, the determined ones of the sets may be considered to be duplicate documents or near-duplicate documents.

In some embodiments, a higher weight may be indicative of a higher level of relevance, or importance, and the constants a and b of Equation 1 may be set to 1. In such embodiments, for each of the sets, a predetermined number of minimum transformed values may be determined. That is, transformed values corresponding to elements having higher weights may have associated lower values than transformed values corresponding to elements having associated lower weights. Ones of the sets having matching ones of the predetermined number of minimum transformed values may then be determined. The predetermined number of minimum transformed values may be 1 minimum transformed value, 3 minimum transformed values, 5 minimum transformed values, or another number of minimum transformed values. A higher number of matching minimum transformed values among sets may be indicative of more similar sets.

In other embodiments, a higher weight may be indicative of a higher level of relevance, or importance, and the constants a and b of Equation 1 may be set to 0 and 1, respectively. In such embodiments, for each of the sets, a predetermined number of maximum transformed values may be determined. That is, transformed values corresponding to elements having higher weights may have higher values than transformed values corresponding to elements having lower weights. Ones of the sets having matching ones of the predetermined number of maximum transformed values may then be determined. The predetermined number of maximum transformed values may be 1 maximum transformed value, 3 maximum transformed values, 5 maximum transformed values, or another number of maximum transformed values. A higher number of matching maximum transformed values among sets may be indicative of more similar sets.

In further embodiments, the constants a and b of equation 1 may have values different than the values discussed above. In addition, in some embodiments, a higher weight may be indicative of a lower level of relevance, or importance, and a lower weight may be indicative of a higher level of relevance, or importance. Embodiments may determine the predetermined number of maximum transformed values when elements having weights indicative of a higher level of relevance, or importance correspond to higher transformed values than elements having weights indicative of a lower level of relevance, or importance. Embodiments may determine the predetermined number of minimum transformed values when elements having weights indicative of a higher level of relevance, or importance, correspond to lower transformed values than elements having weights indicative of a lower level of relevance, or importance.

In addition to determining whether documents are similar, such as, for example, duplicates and near-duplicates, the above-mentioned embodiments may be used for other useful functions. For example, the above-mentioned embodiments may be used to perform collaborative filtering, graph clustering, graph compression, or other useful functions.

Exemplary Processing Device

Figure 1:
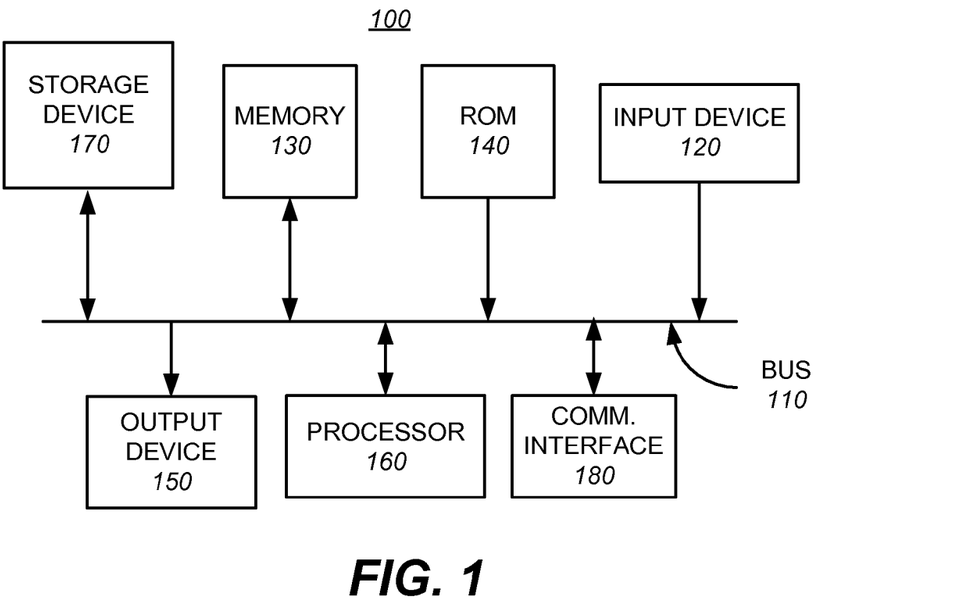
FIG. 1 illustrates a functional block diagram of an exemplary processing device, which may implement embodiments consistent with subject matter of this disclosure.

FIG. 1 is a functional block diagram of an exemplary processing device 100, which may be used to implement embodiments consistent with the subject matter of this disclosure. Processing device 100 may be a desktop personal computer (PC), a laptop PC, a handheld processing device, a server, a server farm, or other processing device. Processing device 100 may include a bus 110, an input device 120, a memory 130, a read only memory (ROM) 140, an output device 150, a processor 160, a storage device 170, and a communication interface 180. Bus 110 may permit communication among components of processing device 100.

Processor 160 may include at least one conventional processor or microprocessor that interprets and executes instructions. Memory 130 may be a random access memory (RAM) or another type of dynamic storage device that stores information and instructions for execution by processor 160. Memory 130 may also store temporary variables or other intermediate information used during execution of instructions by processor 160. ROM 140 may include a conventional ROM device or another type of static storage device that stores static information and instructions for processor 160. Storage device 170 may include compact disc (CD), digital video disc (DVD), a magnetic medium, or other type of storage device for storing data and/or instructions for processor 160.

Input device 120 may include a keyboard, a pointing device or other input device. Output device 150 may include one or more conventional mechanisms that output information, including one or more display monitors, or other output devices. Communication interface 180 may include a transceiver for communicating via one or more networks via a wired, wireless, fiber optic, or other connection.

Processing device 100 may perform such functions in response to processor 160 executing sequences of instructions contained in a tangible machine-readable medium, such as, for example, memory 130, ROM 140, storage device 170 or other medium. Such instructions may be read into memory 130 from another machine-readable medium or from a separate device via communication interface 180.

Exemplary Operating Environment

A single processing device 100 may implement some embodiments consistent with the subject matter of this disclosure. Multiple networked processing devices 100 may implement other embodiments consistent with the subject matter of this disclosure.

Figure 2:
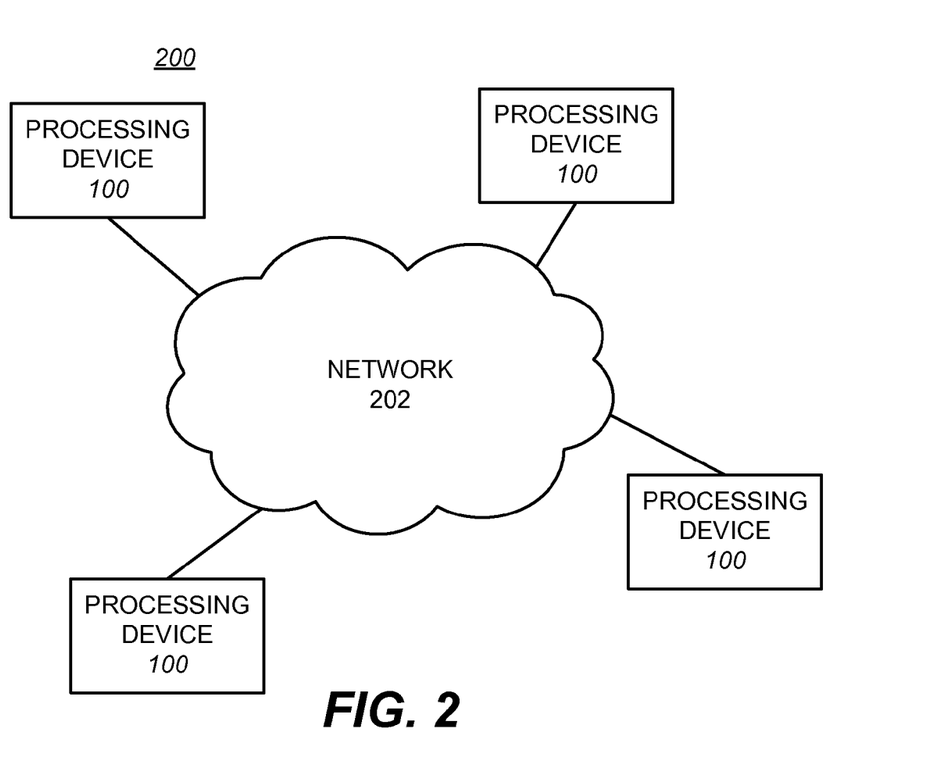
FIG. 2 illustrates an exemplary operating environment for some embodiments consistent with the subject matter of this disclosure.

FIG. 2 illustrates an exemplary operating environment 200 in which some embodiments consistent with the subject matter of this disclosure may operate. exemplary operating environment 200 may include multiple processing devices 100, which may communicate with one or more others of the multiple processing devices via a network 202.

Network 202 may be a single network or a combination of networks, such as, for example, the Internet or other networks. Network 102 may include a wireless network, a wired network, a packet-switching network, a public switched telecommunications network, a fiber-optic network, other types of networks, or any combination of the above.

Exemplary Processing

Figure 3:
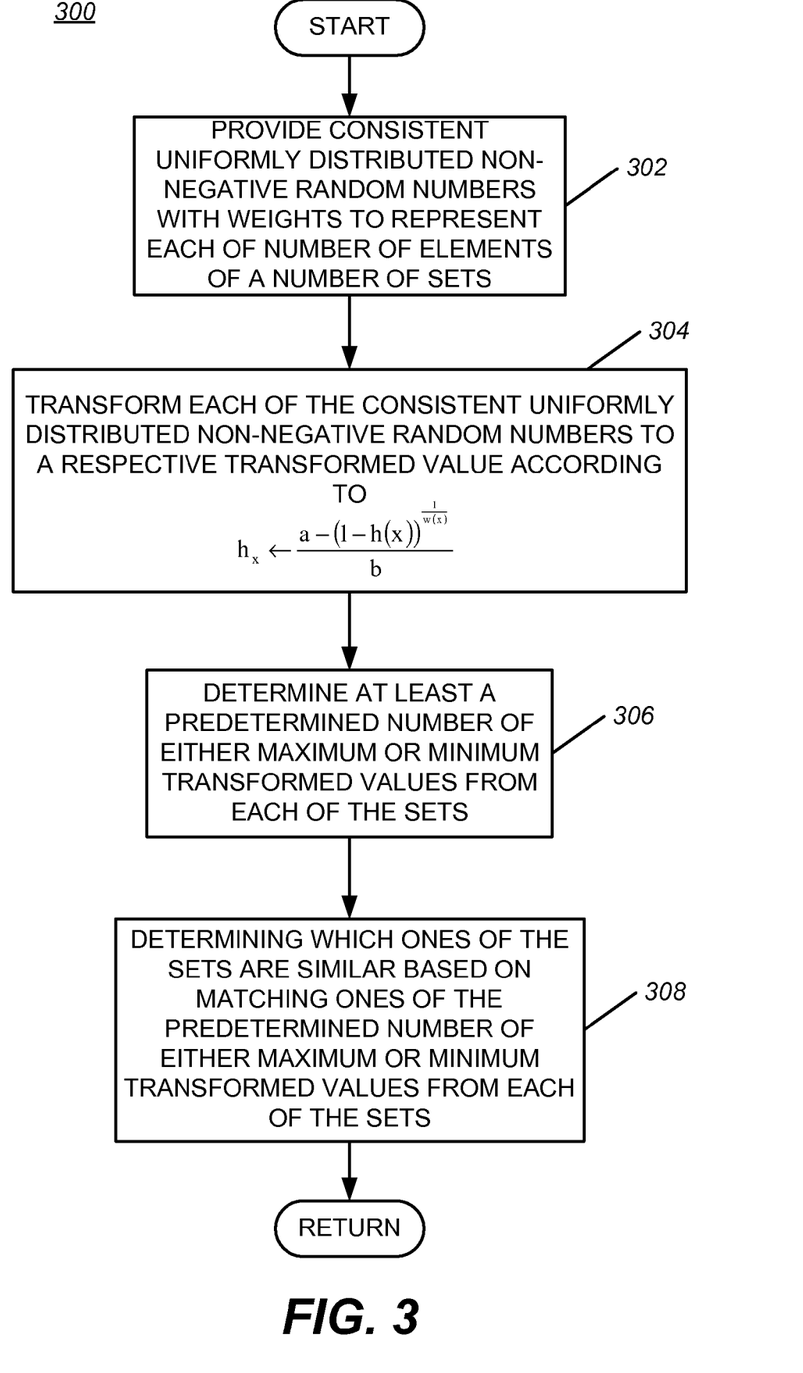
FIG. 3 is a flowchart illustrating an exemplary process for performing efficient weighted consistent sampling in an embodiment consistent with the subject matter of this disclosure.

FIG. 3 is a flowchart illustrating an exemplary process 300, which may be performed in embodiments consistent with the subject matter of this disclosure. The flowchart of FIG. 3 refers to elements and sets. In some embodiments, each of the sets may represent a different document, such as a network document, or other document. Each of the elements may represent respective words, symbols, images, or other items, which may be included within a document. In other embodiments, a set may be a node on a graph and the elements of the set may be links to and/or from the node. In yet other embodiments, a set may be a vertex on a graph and the elements of the set may be edge information with respect to the vertex. In further embodiments, a set may represent other items, which may each include a group of elements.

The process may begin with a processing device, such as, for example, processing device 100, providing consistent uniformly distributed non-negative random numbers, having associated weights, for representing elements of a number of sets (act 302). In some embodiments, a hash function, h, may be applied to each of the elements. The hash function may be a perfect hash function, such that the hash function does not produce any collisions.

Next, the processing device may transform each of the consistent and uniformly distributed non-negative random numbers to a respective transformed value according to $$h_x \leftarrow \frac{a - (1 - h(x))^{\frac{1}{w(x)}}}{b},$$

where $h_x$ is a respective transformed value of an element x, $h(x)$ is a hash function for producing a consistent uniformly distributed random non-negative real number representing the element x, a and b are constants, and $w(x)$ is a value based on a weight associated with the element x (act 304). As mentioned previously, in various embodiments, 0 may be less than or equal to $h(x)$ which may be less than or equal to 1. In some embodiments, $w(x)$ may be the weight associated with the element x, and a and b may be 1. Of course, in other embodiments, a and b may be other values. A high value of $w(x)$ may indicate a high level of relevance, or importance, of an associated element, in some embodiments. In other embodiments, a low value of $w(x)$ may indicate a high level of relevance, or importance, of an associated element.

The processing device may determine at least a predetermined number of either maximum or minimum transformed values with respect to each of the sets of elements (act 306). For example, in an embodiment in which a and b, of the above-mentioned formula, are set to 1, such that the formula becomes $$h_x \leftarrow 1 - (1 - h(x))^{\frac{1}{w(x)}},$$

where $w(x)$ is a weight associated with a respective element x, and a higher value for $w(x)$ indicates a higher level of relevance, or importance, of the element x, at least a predetermined number of minimum transformed values from each of the sets may be determined. In another embodiment, in which a is 0, b is 1, and a higher a value for $w(x)$ indicates a higher level of relevance, or importance, of the element x, at least a predetermined number of maximum transformed values from each of the sets may be determined.

The processing device may then determine which of the sets are similar based on matching ones of the predetermined number of either maximum or minimum transformed values, from each of the sets (act 308). For example, if the predetermined number is 1 and the processing device is determining which of the sets are similar based on a minimum transformed value of each set, then when sets are determined to have a same minimum transformed value, the sets may be considered similar.

In some embodiments, in which sets represent documents, elements, such as, for example, words within each of the documents may have weights based on a desired category of document. For example, if documents concerning automobiles are desired, words pertaining to automobiles, such as, for example, car, mileage, horsepower, acceleration, or other words, may have associated weights indicating a high level of relevance, or importance, while other words may have associated weights indicating a low level of relevance, or importance.

Figure 4:
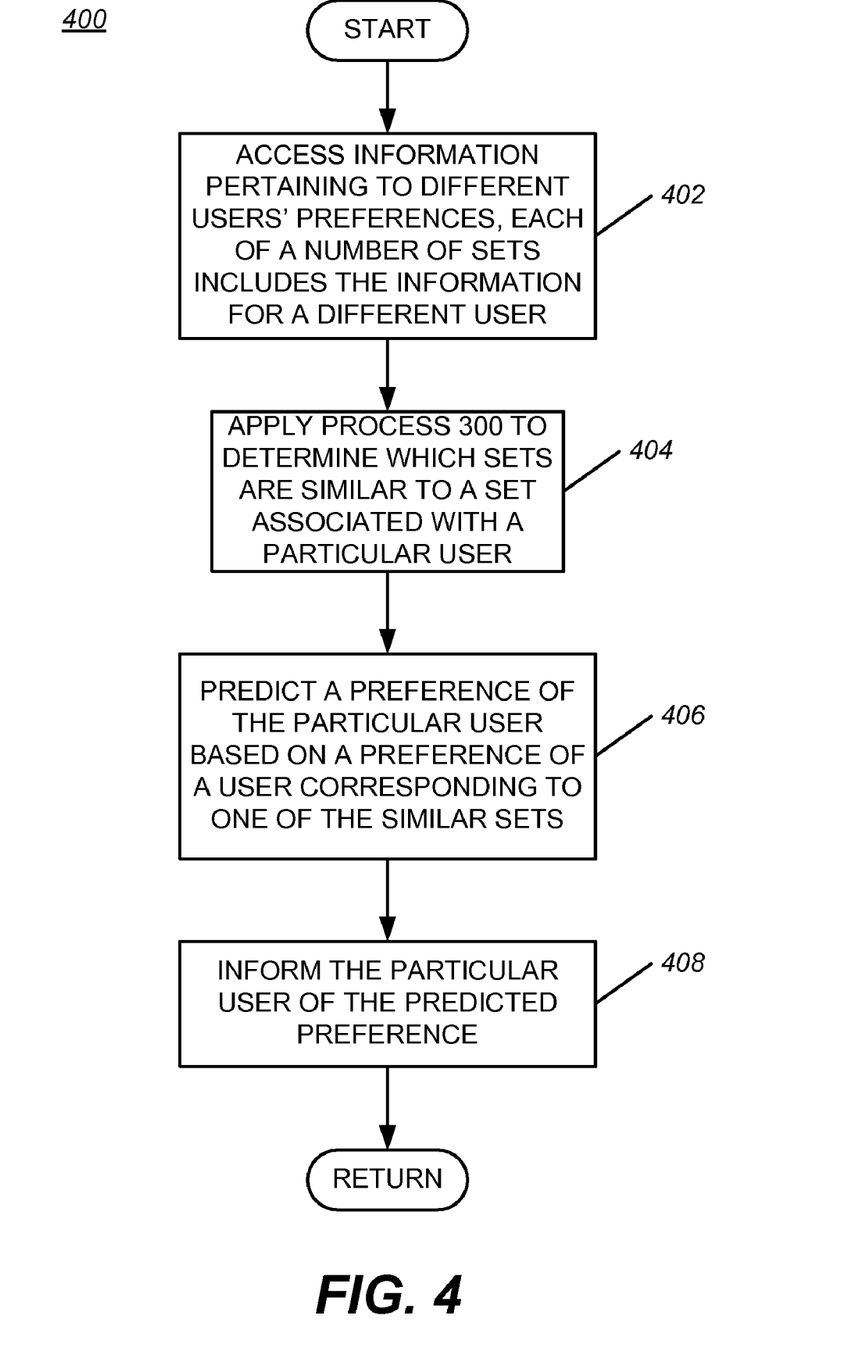
FIG. 4 is a flowchart illustrating an exemplary process for applying the process of FIG. 3 to collaborative filtering.

Process 300 may be applied to other applications, other than duplicate, or near-duplicate, detection. For example, process 300 may be applied to achieve collaborative filtering, graph clustering, and graph compression. FIG. 4 is a flowchart of an exemplary process 400 for performing massive collaborative filtering.

Exemplary process 400 may begin with a processing device, such as, for example, processing device 100, accessing information pertaining to preferences of different users (act 402). That is, each of a number of sets may include information with respect to a different user. As an example, the information in each of the sets may include information regarding products purchased by respective users, or other information. The information may be stored as a bitmap, or other data structure. Thus, elements of each of the sets, in this example, may include information regarding purchases made by respective users. As an example, the purchases may be book purchases. Weights may be applied to each of the elements to indicate a level of importance. For example, books that are typically read by the general population may be given weights indicating a lower level of relevance, while books that are somewhat unusual, or rare, may be given weights indicating a higher level of relevance. Thus, for example, "War and Peace" may have a weight indicating a higher level of relevance than a mystery novel.

Process 300 may then be applied to the above-mentioned elements of the above-mentioned sets to determine ones of the sets that are similar to a set associated with a particular user (act 404). Based on preferences of users with a similar preferences to the particular user, a prediction may be made regarding a preference of the particular user (act 406). Thus, using the above-mentioned book purchasing example, information with respect to book purchases of users who have purchased books similar to books purchased by the particular user may be used to predict one or more book purchases the particular user may wish to make. The processing device may then inform the particular user of the predicted preference (act 408). Again, using the book purchasing example, a message, such as, for example, "Our records indicate that you purchased book A, book B, and book C. Other customers who have purchased these books also purchased book D. Are you interested in purchasing book D?"

Figure 5:
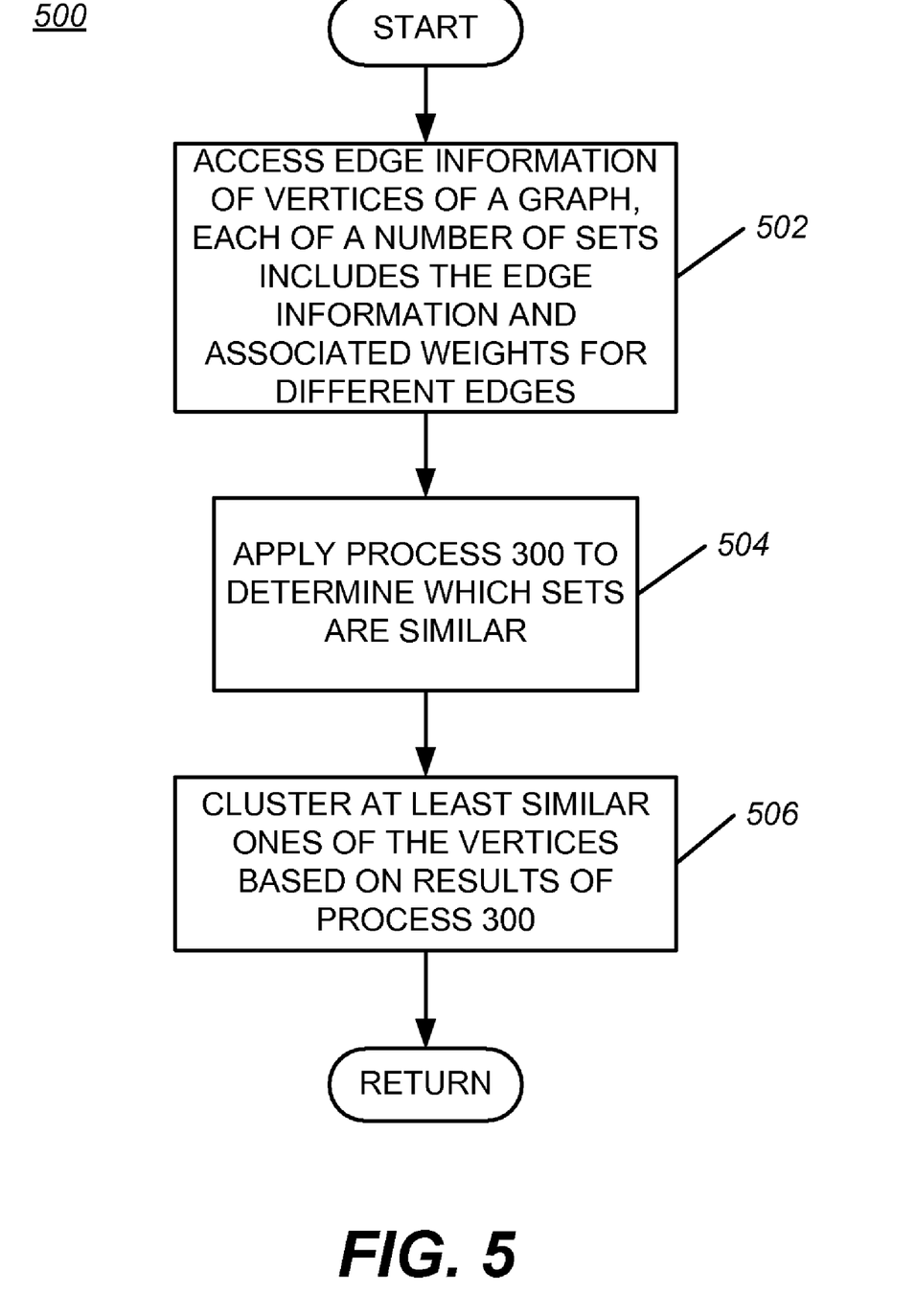
FIG. 5 is a flowchart illustrating an exemplary process for applying the process of FIG. 3 to graph clustering.

FIG. 5 is a flowchart of an exemplary process 500 for performing graph clustering. Graph clustering is a process by which a set of vertices of a graph is divided into disjoint subsets, or clusters, while an amount of edges linking vertices of distinct sets is kept to a minimum.

Exemplary process 500 may begin with a processing device, such as, for example, processing device 100, accessing edge information pertaining to vertices of a graph (act 502). That is, each of a number of sets may include edge information regarding a different vertex. Elements within each of the sets may be items of edge information pertaining to a respective vertex. Each of the items of edge information may have an associated weight indicating a level of relevance, or importance.

Process 300 may then be applied to the above-mentioned elements of the above-mentioned sets to determine ones of the sets of vertices that are similar (act 504). Clustering of similar ones of the sets of vertices may then be performed based on results of process 300 (act 506).

Figure 6:
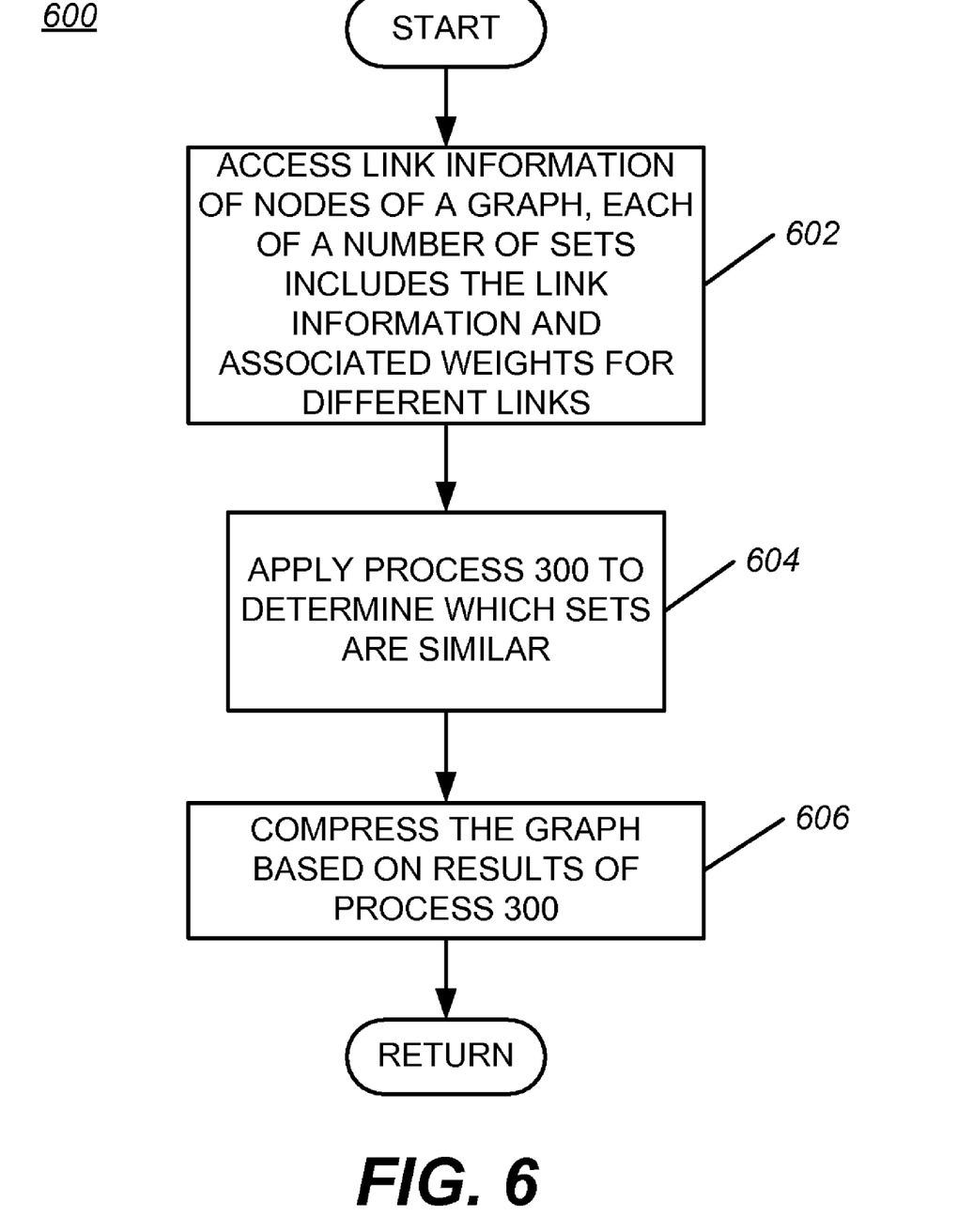
FIG. 6 is a flowchart illustrating an exemplary process for applying the process of FIG. 3 to graph compression.

FIG. 6 is a flowchart of an exemplary process 600 for performing graph compression. Exemplary process 600 may begin with a processing device, such as, for example, processing device 100, accessing link information pertaining to nodes of a graph (act 602). That is, each of a number of sets may include link information regarding a different node of the graph. Each item of link information may have an associated weight indicating a level of relevance, or importance.

Process 300 may then be applied to the above-mentioned elements of the above-mentioned sets to determine ones of the sets that are similar to a set associated with a particular node (act 604). Graph compression of similar ones of the sets of nodes may then be performed based on results of process 300 (act 606).

Figure 7:
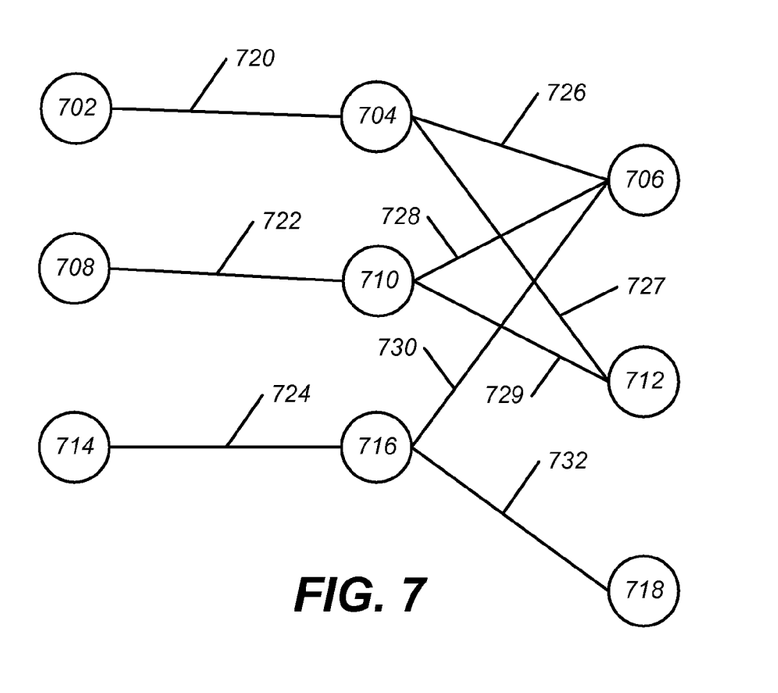
FIG. 7 illustrates an exemplary graph including nodes and links.
Figure 8:
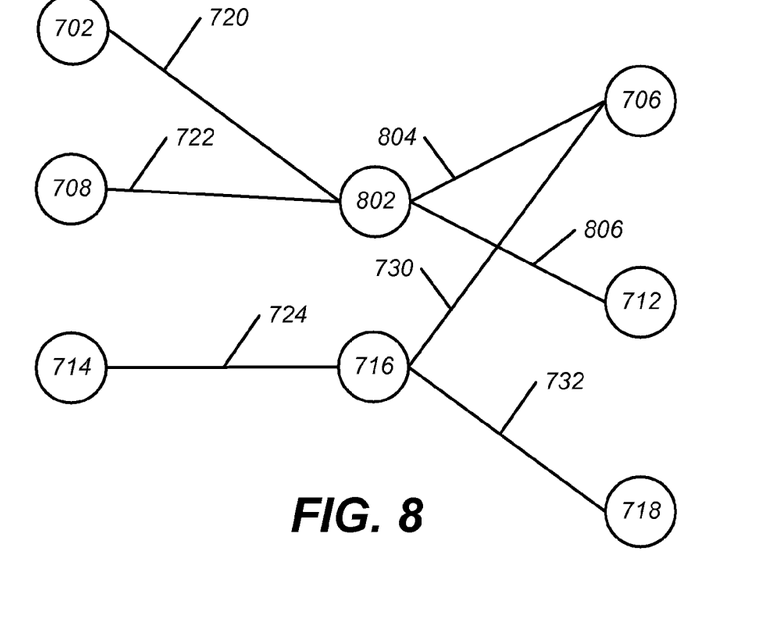
FIG. 8 illustrates the graph of FIG. 7 after graph compression is performed.

FIG. 7 illustrates an exemplary graph having nodes 702-718 and links 720-732. For the sake of simplicity, all links have a same weight, in this example. Examination of FIG. 7 reveals that nodes 704 and 710 both have links to nodes 706 and 712. Links 726 and 727 link node 704 to nodes 706 and 712, respectively, and links 728 and 729 link node 710 to nodes 706 and 712, respectively. Thus, the above-mentioned process illustrated by exemplary flowcharts 300 and 600 may determine that nodes 704 and 710 are similar. As a result, nodes 704 and 710, along with links 726-729 may be eliminated and replaced with node 802 and links 804 and 806, as shown in a compressed graph of FIG. 8. In situations in which nodes have many links to other nodes, a node may be determined to be similar to another node when a predetermined number of links of nodes, according to associated weights, match (are linked to the same nodes).

Figure 9:
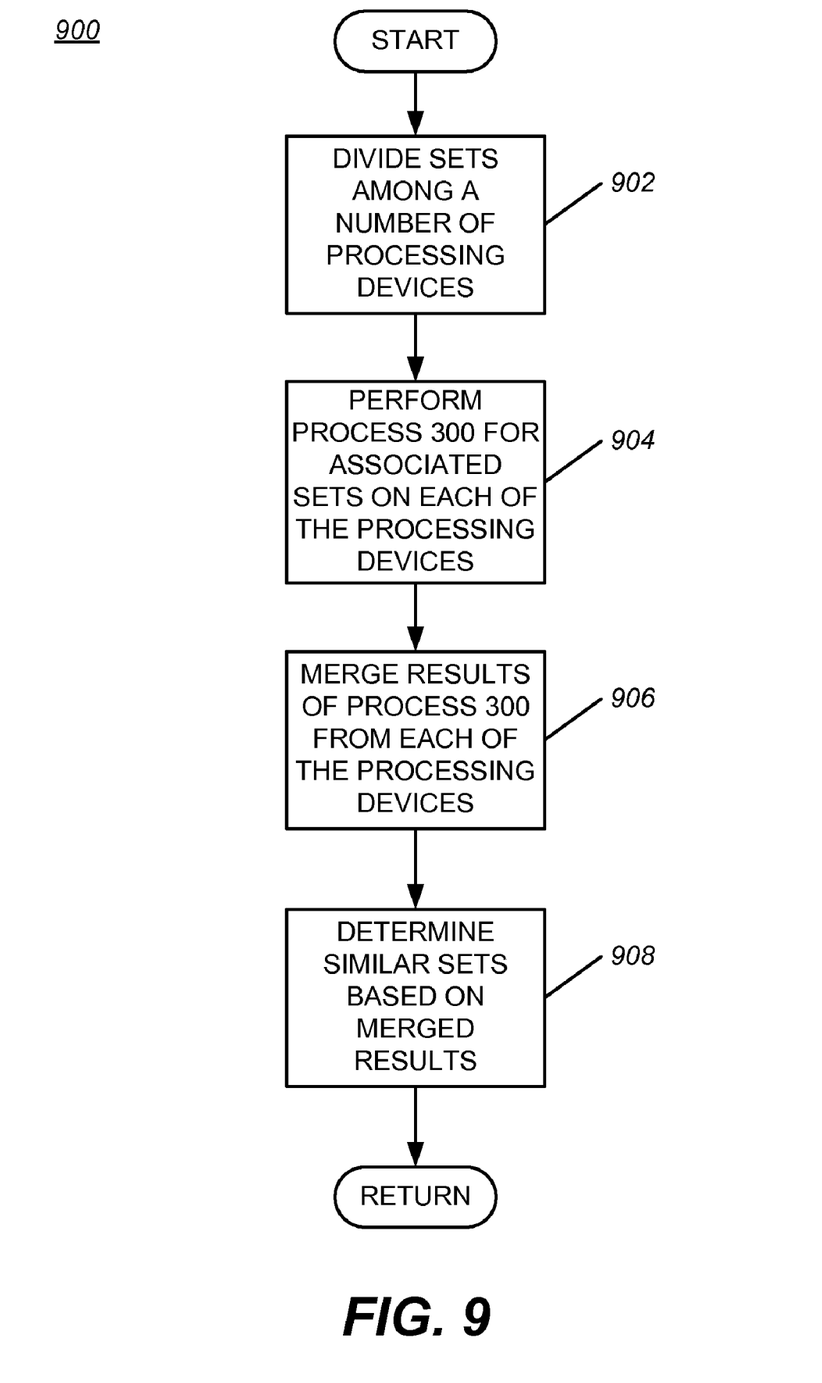
FIG. 9 is a flowchart illustrating an exemplary process for parallelizing the process of FIG. 3.

In some embodiments, exemplary process 300 may be parallelized. FIG. 9 is a flowchart illustrating a process 904 parallelizing process 300. The process may begin with a number of sets, such as any of the sets mentioned above, or other sets, being divided among a number of processing devices by one of the processing devices (act 902). The number of processing devices may be 2, 200, or any other suitable number of processing devices. Each of the processing devices may communicate with one or more others of the processing devices via a network, such as network 202 (FIG. 2). Process 300 may then be performed for associated sets on each of the processing devices (act 904). Results of performing process 300 on the processing devices may be merged on a processing device (act 906). That is, similar ones of the sets, as determined by process 300, may be provided to one of the processing devices, along with any non-similar sets. The one of the processing devices may determine similar sets based on the merged results (act 908). That is, the one of the processing devices may determine whether any of the similar ones of the sets or non-similar ones of the sets are similar to other ones of the sets.

CONCLUSION

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they are not be construed as limiting the claims in any way. Other configurations of the described embodiments are part of the scope of this disclosure. For example, the above-mentioned examples refer to sets of documents, graphs, and purchase history of users. Embodiments consistent with the subject matter of this disclosure are not limited to such sets. Further, implementations consistent with the subject matter of this disclosure may have more or fewer acts than as described, or may implement acts in a different order than as shown. Accordingly, the appended claims and their legal equivalents define the invention, rather than any specific examples given.

The invention claimed is:

1. A machine-implemented method for performing weighted consistent sampling, the machine-implemented method comprising:
   transforming each respective consistent uniformly distributed non-negative random number, representing a corresponding element of a plurality of sets, to a transformed value according to a formula $$h_x \leftarrow \frac{a - (1 - h(x))^{\frac{1}{w(x)}}}{b},$$

where h(x) is a consistent uniformly distributed non-negative random number representing a corresponding element x of a set, a and b are constants, and w(x) is a weight assigned to the corresponding element x;
   determining a respective minimum transformed value for each of the plurality of sets or a respective maximum transformed value for each of the plurality of sets; and
   determining which of the plurality of sets are at least similar based on the respective determined minimum transformed value for each of the plurality of sets or the respective determined maximum transformed value for each of the plurality of sets, wherein
   the machine-implemented method is implemented by at least one processing device.

2. The machine-implemented method of claim 1, further comprising:
   applying a hash function to each of the elements of the plurality of sets to provide each of the respective consistent uniformly distributed non-negative random numbers.

3. The machine-implemented method of claim 1, wherein:
   the a and the b are equal to 1,
   the respective minimum transformed value for each of the plurality of sets is determined, and
   which of the plurality of sets are at least similar is determined based on the respective determined minimum transformed value for each of the plurality of sets.

4. The machine-implemented method of claim 1, further comprising:
   determining a predetermined number of respective minimum transformed values for each of the plurality of sets or a predetermined number of respective maximum transformed values for each of the plurality of sets; and
   determining which of the plurality of sets are near duplicates based on matches among the predetermined number of the respective determined minimum transformed values for each of the plurality of sets or the predetermined number of the respective determined maximum transformed values for each of the plurality of sets.

5. The machine-implemented method of claim 1, wherein:
   each of the plurality of sets represents information pertaining to a different user, and the machine-implemented method further comprises:
   performing collaborative filtering by:
      predicting a preference for a particular user based on a preference of a user corresponding to one of the plurality of sets similar to the set pertaining to the particular user.

6. The machine-implemented method of claim 1, wherein:
   each of the plurality of sets represents edge information pertaining to a different vertex of a graph,
   each of the respective consistent uniformly distributed random numbers corresponds to an item of the edge information for a respective vertex of the graph, and
   the machine-implemented method further comprises:
   performing graph clustering by clustering ones of the plurality of vertices that are determined to be at least similar.

7. The machine-implemented method of claim 1, wherein:
   each of the plurality of sets represents link information pertaining to a different node of a graph,
   each of the respective consistent uniformly distributed random numbers corresponds to an item of the link information for a respective node of the graph, and
   the machine-implemented method further comprises:
   performing graph compression by compressing the graph based on the ones of the plurality of nodes that are determined to be at least similar.

8. A processing device comprising:
   at least one processor; and
   a memory connected to the at least one processor, the memory further comprising:
      instructions for transforming, in only a single pass through original elements of a plurality of sets, respective consistent uniformly distributed non-negative random numbers, representing the original elements of the plurality of sets, to transformed values according to a formula $$h_x \leftarrow \frac{a - (1 - h(x))^{\frac{1}{w(x)}}}{b},$$

where h(x) is a consistent uniformly distributed non-negative random number representing an original element x of a set, a and b are constants, and w(x) is based on a weight assigned to the original element x, and
      instructions for determining a similarity among a plurality of the sets based on a respective minimum transformed value of each of the plurality of sets or based on a respective maximum transformed value of each of the plurality of sets.

9. The processing device of claim 8, wherein the memory further comprises:
   instructions for providing the respective consistent uniformly distributed non-negative random numbers by applying only one hash function to the original elements of the plurality of sets.

10. The processing device of claim 8, wherein:
    each of the plurality of sets corresponds to a different document of a plurality of documents and each of the original elements of each of the plurality of sets corresponds to a respective word of a respective one of the plurality of documents, and
    the memory further comprises:
    instructions for assigning weights to the original elements, such that ones of the original elements corresponding to words related to a particular subject matter are assigned a weight indicating a higher level of relevance than others of the original elements.

11. The processing device of claim 10, wherein the weight indicating a higher level of relevance has a higher value than other weights having a lower level of relevance.

12. The processing device of claim 8, wherein:
    each of the plurality of sets includes purchasing information with respect to a different user, each of the original elements of a respective one of the plurality of sets represents historical purchasing information of a corresponding one of the different users, and the memory further comprises:

instructions for predicting a desire of a particular user for a particular item based on ones of the plurality of sets determined to be similar to a set corresponding to the particular user, and instructions for informing the particular user of the particular item.

13. A machine-implemented method for performing weighted consistent sampling, the machine-implemented method comprising:

providing a consistent uniformly distributed non-negative random number for each of a plurality of original elements of a plurality of sets;

providing a respective weight to each of the plurality of original elements, the respective weight being indicative of a level of relevance;

applying a formula $$h_x \leftarrow \frac{a - (1 - h(x))^{\frac{1}{w(x)}}}{b},$$

where h(x) is one of the provided uniformly distributed non-negative random number representing an element x of a set, a and b are constants, w(x) is based on a weight associated with the element x, and $h_x$ is a transformed value; and determining similar ones of the plurality of sets based on at least one of the transformed values of each of the plurality of sets, wherein the machine-implemented method is implemented by at least one processing device.

14. The machine-implemented method of claim 13, further comprising:

dividing the plurality of sets among a plurality of processors, each of the plurality of processors performing, in parallel, acts of claim 13 with respect to associated ones of the plurality of sets;

merging results of the plurality of processors with respect to the acts of claim 13; and determining similar ones of the plurality of sets based on the merged results.

15. The machine-implemented method of claim 13, wherein:

each of the plurality of sets corresponds to a different document of a plurality of documents and each of the elements of each of the plurality of sets corresponds to a respective word of a respective one of the plurality of documents, and the machine-implemented method further comprises:

determining near-duplicate ones of the plurality of documents based on the determined similar ones of the plurality of sets.

16. The machine-implemented method of claim 13, wherein:

a and b are equal to 1, w(x) is the weight associated with the element x, and the determining of similar ones of the plurality of sets based on at least one of the transformed values of each of the plurality of sets further comprises:

determining a match among a predetermined number of minimum ones of the transformed values of each of the plurality of sets.

17. The machine-implemented method of claim 13, wherein:

the providing of consistent uniformly distributed non-negative random numbers for each of a plurality of original elements of a plurality of sets further comprises:

applying only one hash to each of the plurality of original elements of the plurality of sets, the hash being a perfect hash.

18. The machine-implemented method of claim 13, wherein:

each of the plurality of sets represents link information pertaining to a different node of a graph, each of the provided consistent uniformly distributed non-negative random numbers corresponds to an item of the link information for a respective node of the graph, and the determining of similar ones of the plurality of sets is based on respective minimum or maximum ones of the transformed values of each of the plurality of sets, and the machine-implemented method further comprises:

performing graph compression by compressing the graph based on the determined similar ones of the plurality of sets.

19. The machine-implemented method of claim 13, wherein:

the providing of consistent uniformly distributed non-negative random numbers for each of a plurality of original elements of a plurality of sets further comprises:

applying only one hash function to each of the plurality of original elements of the plurality of sets, the hash function being a perfect hash, and the method further comprises:

applying the formula $$h_x \leftarrow \frac{a - (1 - h(x))^{\frac{1}{w(x)}}}{b}$$

to each of the original elements of the plurality of sets only once, where h(x) is the one hash function.

* * * * *